April 12, 1966  E. D. LEVY  3,245,717
INFANT CAR SEAT
Filed Feb. 19, 1965  2 Sheets-Sheet 1

INVENTOR.
EDWARD D. LEVY
BY John F. Hohmann
ATTORNEY

April 12, 1966 E. D. LEVY 3,245,717
INFANT CAR SEAT

Filed Feb. 19, 1965 2 Sheets-Sheet 2

INVENTOR.
EDWARD D. LEVY
BY
ATTORNEY

United States Patent Office 3,245,717
Patented Apr. 12, 1966

3,245,717
INFANT CAR SEAT
Edward D. Levy, Spring Valley, N.Y., assignor to Union Carbide Corporation, a corporation of New York
Filed Feb. 19, 1965, Ser. No. 433,966
8 Claims. (Cl. 297—254)

This invention relates to an infant car seat and more particularly to a foldable plastic infant car seat.

Present day infant car seats are fabricated from a multitude of parts and consequently require a number of time consuming and costly assembly operations. For example, the seat and back portions generally are metal provided with suitable cushioning means. The seat and back portions are then connected to each other by additional metal parts which are riveted in place. However, the riveted connections weaken the metal parts and often cause failure during normal use of the seat. The employment of metal in the car seat results in an undesirably high overall weight and makes normal handling cumbersome.

Accordingly, it is an object of this invention to provide a foldable infant plastic car seat which is light weight and fabricated from a minimum of parts requiring a minimum of assembly operations.

Broadly, the foldable infant car seat of this invention comprises a rigid one-piece back member having resilient cushion means therein and a rigid one-piece plastic seat member hingeably fastened on the back member and having resilient cushion means mounted therein adapted to fold against the back member in a closed position for storage or carrying. The back member has a pivot support means proximate the seat member and a load-bearing shoulder adjacent thereto. The back member is further provided with socket means adjacent to the pivot support means adapted to receive upwardly extending hanger means. The car seat also has hanger means swivelly mounted in the socket means and adapted to support the infant car seat on the back of a car seat. Slidably mounted on the hanger means is a curved infant confining means.

The seat member has an upwardly extending rear edge adapted to engage the lower edge of the back member when the infant car seat is in an open position. The seat member is further provided with pivot means proximate the back member adapted to pivot in the pivot support means of the back member and portions proximate the pivot means adapted to engage the load-bearing shoulders of the back member. Finally, means are provided to secure the pivot in the pivot support means.

Figure 1:
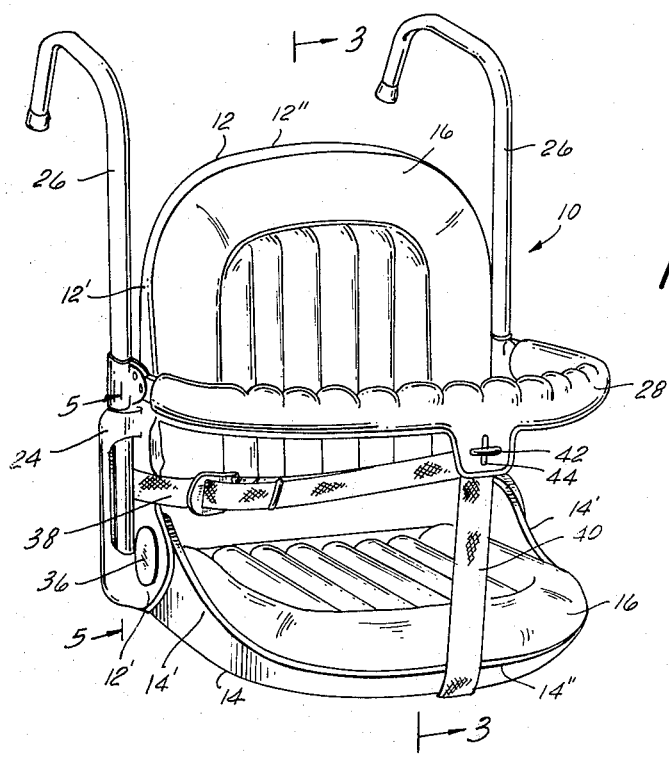
FIG. 1 is an isometric view of an infant car seat embodying the invention.

Referring now to the drawing, there is shown in FIG. 1 an infant car seat 10 having a rigid one-piece plastic back member 12 and a rigid one-piece plastic seat member 14, each of which is generally concave (FIG. 2) and have resilient cushion means 16 mounted therein by suitable adhesive or mechanical means.

Figure 2:
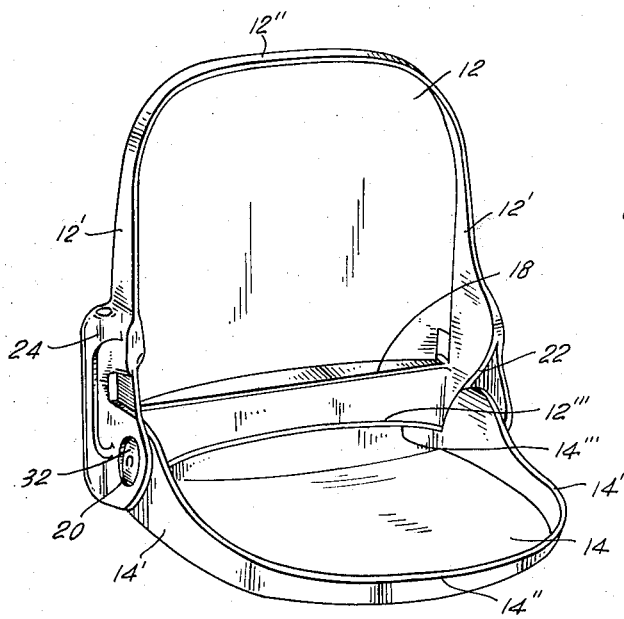
FIG. 2 is an isometric view of the car seat of FIG. 1 illustrating the rigid back and seat members.
Figure 6:
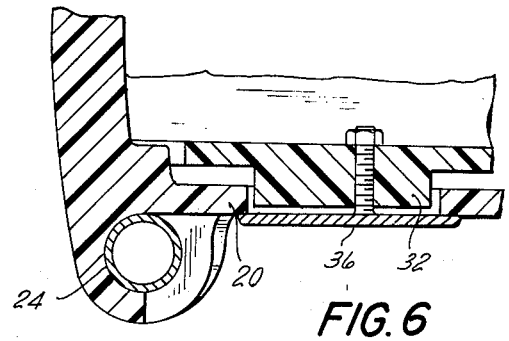
FIG. 6 is a horizontal sectional view taken along line 6—6 of FIG. 5.
Figure 3:
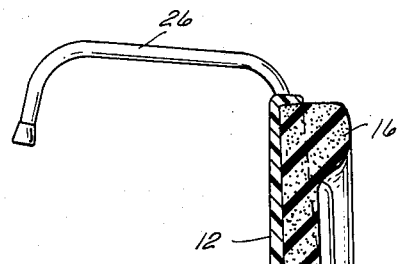
FIG. 3 is a vertical sectional view of the car seat of FIG. 1 taken along line 3—3.

As shown in FIG. 2, the generally concave back member 12 has side edges 12' and a top edge 12" extending outwardly therefrom adapted to receive the cushion means 16. Integrally formed with the back member 12 is a transverse reinforcing rib 18 adapted to engage the lower bottom edge of the cushion means 16 (FIG. 3). Positioned in the lower portions of the side edges 12' of the back member 12 is pivot support means 20 (FIG. 6) having a load-bearing shoulder 22 associated therewith and adjacent thereto and positioned on the lower outside edges thereof is socket means 24 (FIG. 6). The extended portions of a pair of inverted hangers 26 (FIG. 1) are swivelly mounted in the socket means 24 by means of a rivet 46 (FIG. 5) or an equivalent thereof and are adapted to be hung over the back portion of a car seat supporting the infant car seat 10. Curved cushioned infant confining means 28 is slidably mounted on the inverted hangers 26 and is adapted to pivot between horizontal and vertical positions with respect to the back member 12 (FIGS. 3 and 4) and is further adapted to rest upon the uppermost portion of the socket means 24 (FIG. 1).

Figure 5:
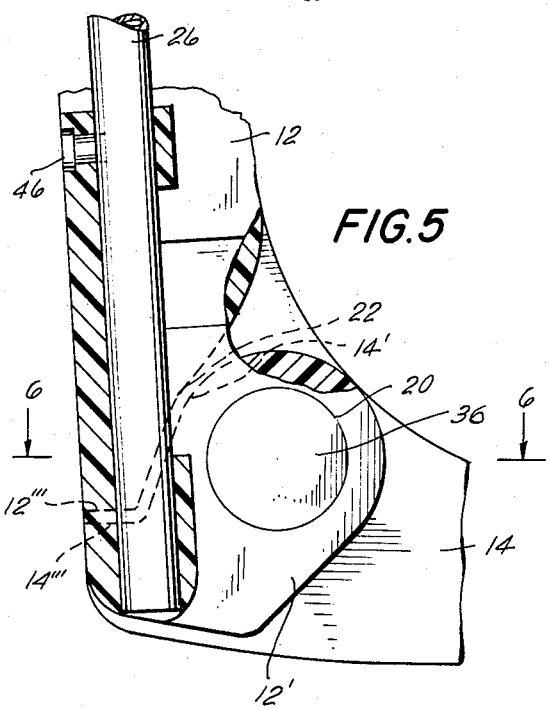
FIG. 5 is a vertical elevation of a portion of the seat of FIG. 1 including a sectional view along line 5—5 and a partial sectional view.

As further shown in FIG. 2 the generally concave seat member 14 has side edges 14' and a front edge 14" extending upwardly therefrom. An upwardly extending rear edge 14''' thereof is adapted to engage the lower edge 12''' of the back member (FIGS. 3 and 5) when the infant car seat 10 is in an open position. Such an arrangement is desirable so as to equally distribute the force created by the infant's weight between the rigid back and seat members 12 and 14 thereby preventing the seat member 14 from collapsing. The seat member 14 is further provided with pivot means 32 positioned on the outside rear portions of the side edges 14' thereof adapted to pivot in the pivot support means 20 of the back member 12 (FIG. 6). The pivot means 32 is secured in the pivot support means 20 by a headed pin 36 (FIGS. 1 and 6). An upper rear portion of the side edges 14' of the seat member 14 is adapted to engage the load-bearing shoulders 22 of the back member 12 (FIG. 5). Here, again such an arrangement is advantageous to equally divide the force created by the infant's weight between the rigid back and seat members 12 and 14. Consequently, the infant car seat 10 will not collapse nor fail structurally when a child is normally seated.

Figure 4:
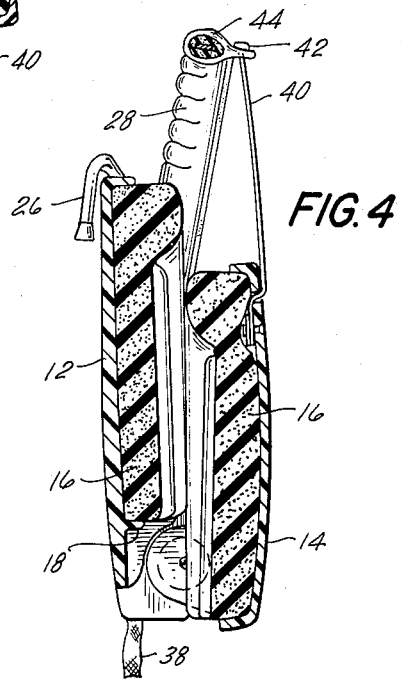
FIG. 4 is a view similar to FIG. 3 illustrating the car seat in a folded position.

As illustrated in FIG. 1 a waist strap 38 is attached to the back member 12 and a crotch strap 40 positioned centrally of the seat member 14 is attached thereto (FIG. 4). In addition, the other end of the crotch strap 40 contains a safety snap 42 which is adapted to engage a safety clasp 44 which is located centrally and below the infant confining means 28.

The one-piece plastic back member and the one-piece plastic seat member of the infant car seat of the invention provide an article of much lighter weight than the conventional all metal car seat without any sacrifice of strength. Furthermore, because the present infant car seat requires a minimum of parts for its fabrication, its assembly operation is simplified thereby resulting in substantial cost savings.

For purposes of the invention it is preferred to injection mold the rigid back and seat members of the invention in the form of a rigid thermoplastic material which gives an advantageous low ratio of strength to weight, for example rigid foamed high-density polyethylene. However, other typical choices are thermoplastic compositions such as polypropylene, polystyrene and mixtures and foams thereof, copolymers of ethylene and propylene, mixtures and foams of such polyolefins, and polyvinyl halides. While vinyl foam is desirable as the resilient cushion means for the proposed infant car seat any comparable cushioning can be employed. Furthermore, in place of the injection molding method, other comparable methods can be substituted such as vacuum forming and compression molding.

It is preferred that the rigid back and seat members have an average thickness of about 0.1875 inch, however, an average thickness of about 0.125 inch would suffice.

What is claimed is:
1. Foldable infant car seat comprising:
 (A) rigid one-piece plastic back member having resilient cushion means mounted therein;
 (B) rigid one-piece plastic seat member hingeably fastened to said back member having resilient cushion means mounted therein and adapted to fold against said back member in a closed position;
 (C) said back member having
  (1) pivot support means proximate said seat member and a load-bearing shoulder adjacent thereto, and
  (2) socket means adjacent to said pivot support means adapted to receive upwardly extending hanger means;
 (D) hanger means swively mounted in said socket means and adapted to support the seat assembly on the back of a car seat;
 (E) curved infant confining means slidably mounted on said hanger means;
 (F) said seat member having
  (1) an upwardly extending rear edge adapted to engage the lower edge of said back member when said infant car seat is in an open position,
  (2) pivot means proximate said back member adapted to pivot in the pivot support means of said back member,
  (3) portions proximate said pivot means adapted to engage said load-bearing shoulders of said back member, and
 (G) means to secure said pivot in said pivot support means.

2. The foldable infant car seat of claim 1 wherein said rigid back and seat members have an average thickness of about 0.125 inch.

3. The foldable infant car seat of claim 1 wherein said rigid plastic members comprise high-density polyethylene.

4. The foldable infant car seat of claim 3 wherein said resilient cushion means comprises vinyl foam.

5. Foldable infant car seat comprising:
 (A) rigid one-piece plastic back member having resilient cushion means mounted therein;
 (B) rigid one-piece plastic seat member hingeably fastened to said back member having resilient cushion means mounted therein and adapted to fold against said back member in a closed position;
 (C) said back member having
  (1) a generally concave back and edges extending outwardly from the sides and top thereof adapted to receive cushion means,
  (2) a transverse reinforcing rib positioned in said back to engage the lower bottom edge of said cushion means,
  (3) pivot support means positioned in the lower portions of said side edges and having a load-bearing shoulder associated therewith, and
  (4) socket means positioned on the lower outside edges and adapted to receive upwardly extending hanger means;
 (D) hanger means swively mounted in said socket means and adapted to support the seat assembly on the back of a car seat;
 (E) curved cushioned infant confining means slidably mounted on said hanger means and adapted to pivot between horizontal and vertical positions with respect to said back member and further adapted to rest upon the uppermost portion of said socket means;
 (F) waist strap means attached to said back member;
 (G) said seat member having
  (1) a generally concave seat and edges extending upwardly from the sides and front thereof and adapted to receive said cushion means,
  (2) an upwardly extending rear edge adapted to engage the lower edge of said back member when said seat is in an open position,
  (3) pivot means positioned on the outside rear portions of said side edges adapted to pivot in the pivot support means of said back member,
  (4) the upper rear portion of said side edges adapted to engage said load-bearing shoulders of said back member;
 (H) strap means attached to said seat member and positioned centrally of said front edge and adapted to be detachably attached to said curved confining means.

6. The foldable infant car seat of claim 5 wherein said rigid back and seat members having an average thickness of about 0.125 inch.

7. The foldable infant car seat of claim 5 wherein said rigid plastic members comprise high-density polyethylene.

8. The foldable infant car seat of claim 7 wherein said resilient cushion means comprises vinyl foam.

References Cited by the Examiner

UNITED STATES PATENTS

| 119,515 | 10/1871 | Gregg | 297—335 |
| 272,166 | 2/1883 | Shepler | 297—335 |
| 2,676,644 | 4/1954 | Fleisher | 297—256 |
| 3,052,500 | 9/1962 | Hyde | 297—254 |
| 3,054,637 | 9/1962 | Pambello | 297—256 |
| 3,065,028 | 11/1062 | Irion | 297—254 |

FOREIGN PATENTS

| 211,050 | 2/1924 | Great Britain. |

FRANK B. SHERRY, *Primary Examiner.*